US010137960B2

(12) United States Patent
Gibbings

(10) Patent No.: US 10,137,960 B2
(45) Date of Patent: Nov. 27, 2018

(54) ELECTRIC BICYCLE

(71) Applicant: S.C.P. TYPHOON, Monaco (MC)

(72) Inventor: Henry Albert Gibbings, Monaco (MC)

(73) Assignee: S.C.P. TYPHOON, Monaco (MC)

(*) Notice: Subject to any disclaimer, the term of this patent is extended or adjusted under 35 U.S.C. 154(b) by 79 days.

(21) Appl. No.: 15/390,679

(22) Filed: Dec. 26, 2016

(65) Prior Publication Data
US 2017/0183057 A1 Jun. 29, 2017

Related U.S. Application Data

(60) Provisional application No. 62/271,304, filed on Dec. 27, 2015.

(51) Int. Cl.
B60W 20/00 (2016.01)
B62M 6/50 (2010.01)
(Continued)

(52) U.S. Cl.
CPC .............. B62M 6/50 (2013.01); B60W 10/08 (2013.01); B60W 20/15 (2016.01); B60W 20/50 (2013.01);
(Continued)

(58) Field of Classification Search
CPC .......... G01R 31/343; B60K 6/46; B60K 6/48; B60K 6/543; B60L 11/12; B60L 11/1851; B60W 20/00; B60W 20/13; B60W 20/30; B60W 20/15; B60W 20/50; B60W 10/06; B60W 10/08; B60W 10/26; B60W 10/101; B60W 10/04; B60W 30/1884;
(Continued)

(56) References Cited

U.S. PATENT DOCUMENTS 5,375,676 A * 12/1994 Takata ..................... B62M 6/45
180/206.2
5,450,915 A 9/1995 Li
(Continued)

FOREIGN PATENT DOCUMENTS

DE 3018333 A1 * 11/1980 .......... B60L 11/1801
DE 10101213 A1 7/2002
(Continued)

Primary Examiner — Joseph H Rocca
Assistant Examiner — Daniel S Yeagley
(74) Attorney, Agent, or Firm — Idea Intellectual Limited; Margaret A. Burke; Sam T. Yip

(57) ABSTRACT

A electric motor system for supplying assistive propelling power to a bicycle, comprising: one or more drivetrains, each comprising a motor-drive shaft having a pinion with fixed drive system driving a crown and bearing assembly connected to a spindle; and a controller for executing a motor control sequence comprising: an initial state activated by a rider's start command where the motor speed is being detected for an initial period, and if the motor speed is higher than a first speed threshold continuously for a first period, then the motor is turned on to output a rider-selected torque level; a continuous motor speed detection state where the motor speed is being continuously detected, and if the motor speed falls below a second speed threshold continuously for a second period, then the motor is turned off; and the motor is turned off if a stop command from the rider is received.

10 Claims, 12 Drawing Sheets

(51) Int. Cl.
*B60W 20/50* (2016.01)
*H02J 7/14* (2006.01)
*B60W 10/08* (2006.01)
*B60W 20/15* (2016.01)
*B62M 3/00* (2006.01)
*B62M 6/55* (2010.01)
*B62M 6/90* (2010.01)
*B62M 6/45* (2010.01)
*B62K 19/34* (2006.01)
*B62K 19/40* (2006.01)

(52) U.S. Cl.
CPC .............. *B62K 19/34* (2013.01); *B62K 19/40* (2013.01); *B62M 3/003* (2013.01); *B62M 6/45* (2013.01); *B62M 6/55* (2013.01); *B62M 6/90* (2013.01); *H02J 7/1407* (2013.01)

(58) Field of Classification Search
CPC ............. B60W 2050/045; H02J 7/1446; H02J 7/1407; B62M 6/50; B62M 6/45
USPC .............................................. 180/206.2, 206.3
See application file for complete search history.

(56) References Cited

U.S. PATENT DOCUMENTS

| | | | |
|---|---|---|---|
| 5,857,537 A * | 1/1999 | Matsumoto | B62M 6/45 180/206.2 |
| 6,446,745 B1 * | 9/2002 | Lee | B60L 1/14 180/206.2 |
| 8,616,321 B2 * | 12/2013 | Aoki | B62M 6/45 180/206.1 |
| 8,874,296 B2 * | 10/2014 | Chun | B60L 11/00 701/22 |
| 9,540,069 B2 * | 1/2017 | Strothmann | B62M 6/50 |
| 2005/0256618 A1 * | 11/2005 | Hsieh | G01R 31/343 701/22 |
| 2012/0290160 A1 * | 11/2012 | McVean | B62M 6/45 701/22 |
| 2015/0011346 A1 | 1/2015 | Macmartin | |
| 2018/0009504 A1 * | 1/2018 | Elliott | B62M 6/55 |
| 2018/0029667 A1 * | 2/2018 | Elliott | B62M 6/55 |

FOREIGN PATENT DOCUMENTS

| | | |
|---|---|---|
| DE | 202004014189 U1 | 11/2004 |
| DE | 102006032016 A1 | 1/2008 |
| DE | 202012103684 U1 | 11/2012 |
| DE | 202015002591 U1 | 8/2015 |
| EP | 2650203 A1 | 10/2013 |
| GB | 2050270 A | 1/1981 |
| JP | 3818462 B2 | 9/2006 |
| WO | 2012030213 A1 | 3/2012 |

* cited by examiner

ELECTRIC BICYCLE

CLAIM FOR PRIORITY

This application claims the benefit of U.S. Provisional Patent Application No. 62/271,304, filed on Dec. 27, 2015; the disclosure of which is incorporated by reference herein in its entirety.

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The present invention generally relates to electrical power assisted pedal-driven bicycles.

BACKGROUND

Most currently available motorized bicycles have either add-on or complete designs of electric motors or petro-powered motors attached to or integrated with the basic pedal-driven bicycles. However, most of these motorized bicycles are visibly identifiable as different from conventional un-motorized bicycles. Modern bicycles have body frames of open structures formed by interconnecting tubes to keep weight down while maintaining rigid structural integrity. This makes concealing the motors, batteries, and fuel tanks a challenge.

SUMMARY OF THE INVENTION

It is an objective of the present invention to provide a system of battery-powered electric motor propulsion for supplying assistive propelling power to conventional bicycles. It is a further objective of the present invention to provide such system with concealed and disguised components such that a motorized bicycle incorporating such system appears to be substantially similar to a conventional un-motorized bicycle. It is a still further objective of the present invention to provide such system that can be adopted in existing conventional un-motorized bicycles without significant alternation to the major components of the bicycles as an after market enhancement, or be easily incorporated into new designs of bicycles.

The system of battery-powered electric motor propulsion comprises a specially designed bicycle frame, a bottom bracket, a drivetrain, and a battery power supply.

BRIEF DESCRIPTION OF THE DRAWINGS

Embodiments of the invention are described in more details hereinafter with reference to the drawings, in which.

DETAILED DESCRIPTION

In the following description, motorized bicycles and systems of battery-powered electric motor propulsion for supplying assistive propelling power to conventional bicycles are set forth as preferred examples. It will be apparent to those skilled in the art that modifications, including additions and/or substitutions may be made without departing from the scope and spirit of the invention. Specific details may be omitted so as not to obscure the invention; however, the disclosure is written to enable one skilled in the art to practice the teachings herein without undue experimentation.

The system of battery-powered electric motor propulsion in accordance to various embodiments of the present invention comprises a specially designed bicycle frame, a bottom bracket, a drivetrain, and a battery power supply.

Bicycle Frame

Figure 1:
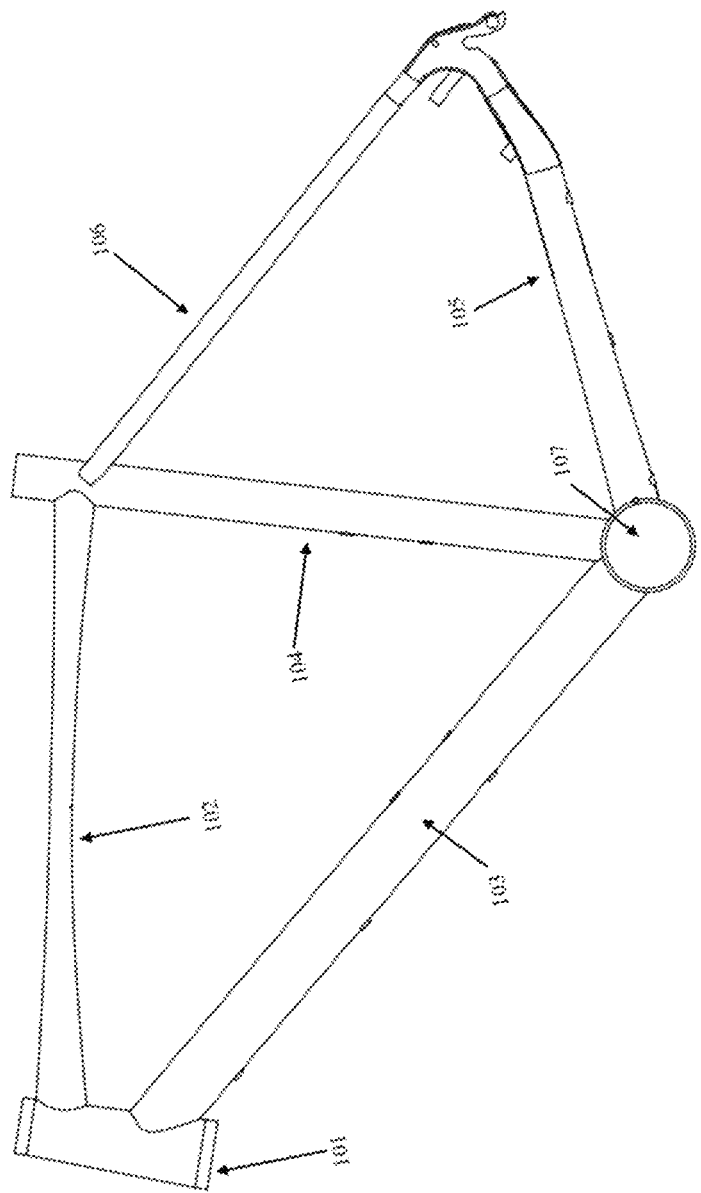
FIG. 1 shows a typical "diamond" upright bicycle frame.

Various embodiments of the specially designed bicycle frame in accordance to the present invention are based on the modern upright bicycle frame called the "diamond" frame. FIG. 1 shows a typical "diamond" frame. Resembling the shape of a diamond, the profile of "diamond" frame is made up of two triangles: a main triangle and a paired rear triangle. Referring to FIG. 1. The frame has a tubular structure having a head tube 101, top tube 102, down tube 103, seat tube 104, a pair of chain stays 105, and a pair of seat stays 106. The head tube 101 contains the headset, which is the interface with the fork. The top tube 102 connects the head tube 101 to the seat tube 104 at the top. The top tube 102 may be positioned somewhat horizontally (parallel to the ground when the bicycle frame is placed upright vertically). The down tube 103 connects the head tube 101 to the bottom bracket shell 107. The seat tube 104 connects to and provides support to the seat at the top and connects to the bottom bracket shell 107 at the bottom. The chain stays 105 run in proximately parallel to the top tube 102 connecting the bottom bracket shell 107 to the rear fork ends. The seat stays 106 connect the top of the seat tube 104 to the rear fork ends.

In a first embodiment of the specially designed bicycle frame in accordance to the present invention, the down tube and/or the seat tube are securely connected (e.g. by welding) to the bottom bracket shell on its cylindrical wall. The bottom bracket shell is an open cylinder without its bases covered. The bottom bracket shell provides one or two through-hole(s) at where the down tube and/or the seat tube are connected to the bottom bracket shell. The size(s) of these one or two top through-hole(s) approximately match the sectional width(s) of the down tube and/or the seat tube. This configuration allows the hollow interiors of the bottom bracket shell, the down tube, and/or the seat tube to be interconnected. The bottom-facing side (opposite of the down tube and/or the seat tube) of the cylindrical wall of the bottom bracket shell also has one or more through-hole(s). The openings are axially aligned with the down tube and/or seat tube in their longitudinal directions. These bottom through-hole(s) allow the insertion of electric motor and gearbox assembly(ies) of the drivetrain into the down tube and/or the seat tube through the bottom bracket shell.

Figure 2:
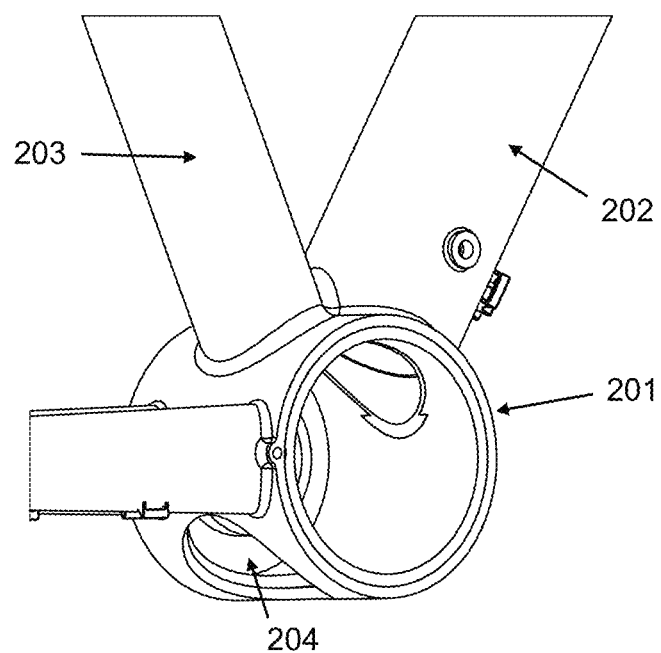
FIG. 2 depicts a bottom bracket shell portion of a bicycle frame in accordance to one embodiment of the present invention.

Shown in FIG. 2 is a bottom bracket shell 201 that is connected to the down tube 202 and the seat tube 203 of a bicycle frame. In this embodiment, the bottom bracket shell 201 has one through-hole 204 to allow the insertion of a drivetrain electric motor and gearbox assembly from the outside through the through hole 204 and the bottom bracket shell 201 and into the interior of the down tube 202.

The down tube and/or the seat tube have one or more threaded or unthreaded through hole(s) at specific location(s) to allow screw(s) or bolt(s) to penetrate through the wall(s) of the down tube and/or the seat tube and be fasten to the inserted electric motor and gearbox assembly(ies), thus securing the electric motor and gearbox assembly(ies) inside the down tube and/or the seat tube. In addition, the down tube and/or the seat tube have one or more opening(s) on their wall(s) to allow electrical wire(s) to connect the electric motor(s) from outside of the down tube and/or the seat tube. The electrical wire(s) may connect with the battery power supply assembly and/or an electronic control circuitry.

In a second embodiment of the specially designed bicycle frame, the bottom bracket shell is detachable from the main bicycle frame structure. The down tube and the seat tube are connected to a hub at their bottom ends, or arranged to have their bottom ends fixed at close proximity to each other. In all of the aforesaid configurations, the down tube and/or the seat tube are open at their bottom ends, making the interior space of the down tube and/or the seat tube accessible through their bottom end(s). In the configuration where the down tube and the seat tube are connected to a hub, the hub provides one or two opening(s) at where the down tube and the seat tube join the hub in such a way that access to the hollow interior space of the down tube and/or the seat tube through the hub is unobstructed.

The detachable bottom bracket shell here is also a cylindrical drum with its the bases uncovered. The bottom bracket shell provides one or two through-hole(s) on its cylindrical wall at location(s) that can be aligned with the bottom end opening(s) of the down tube and/or the seat tube when the bottom bracket shell is attached to the hub or the bottom end(s) of the down tube and/or the seat tube. This enables the hollow interiors of the bottom bracket shell, the down tube, and/or the seat tube to be interconnected. Finally, the bottom bracket shell can be secured to the hub or to the bottom ends of the down tube and seat tube by screws, nuts and bolts, other mechanical fasteners, or welding.

During assembly, the electric motor and gearbox assembly(ies) of the drivetrain are first inserted into and secured inside the down tube and/or the seat tube. In the first embodiment of the bicycle frame with a non-detachable bottom bracket shell, however, a bottom bracket housing may needed to be installed in the bottom bracket shell before the installation of the electric motor and gearbox assembly(ies). Then the bottom bracket is assembled in the bottom bracket shell. In the second embodiment of the bicycle frame with a detachable bottom bracket shell, the detachable bottom bracket shell with the assembled bottom bracket there within is attached to the bicycle frame, connecting with the bottom ends of the down tube and the seat tube. With the electric motor-gearbox drive shaft(s) extending into the bottom bracket, the position of the electric motor and gearbox assembly is adjusted so to have the electric motor-gearbox drive shaft gear pinion aligned and engaged with the crown gear teeth of the crown and bearing assembly provided in the bottom bracket, thus connecting the drivetrain to the spindle.

An ordinarily skilled person in the art will appreciate that other configurations similar to those in the foregoing embodiments are possible so long the one or more electric motor and gearbox assembly(ies) can be inserted into and secured within one or more of the bicycle frame tubes and that portion(s) of the secured motor and gearbox assembly(ies) are allowed to be extended into the interior of the bottom bracket shell.

Bottom Bracket

The bottom bracket shell is to house the bottom bracket that connects the electric motor-gearbox drive shaft to the spindle. A portion of the electric motor and gearbox assembly, which includes at least the drive shaft, is extended into the bottom bracket shell through the one or two top through-hole(s) at where the down tube and/or the seat tube are connected to the bottom bracket shell.

Figure 3:
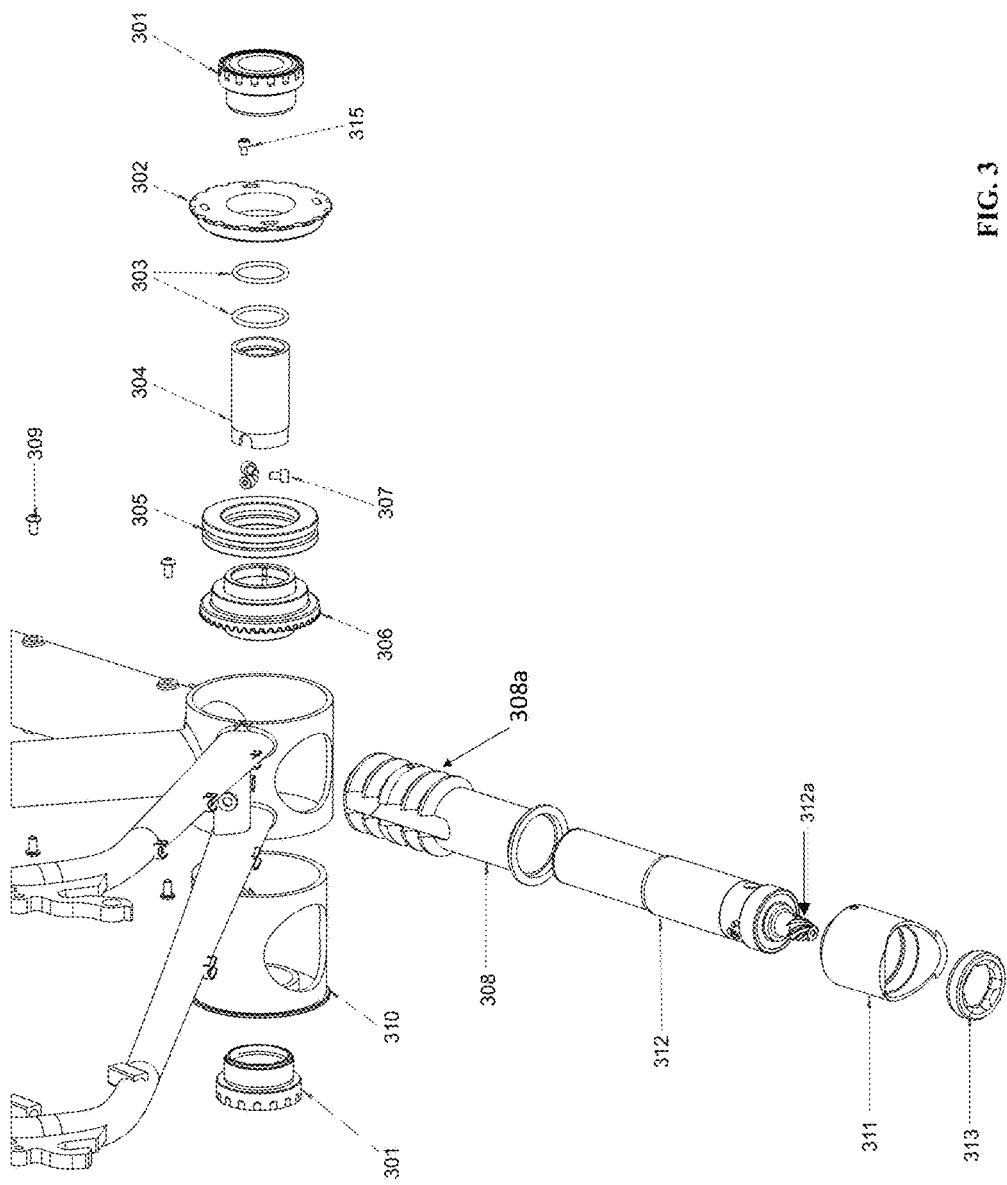
FIG. 3 depicts a bottom bracket shell portion of a bicycle frame along with bottom bracket components and drivetrain components in accordance to one embodiment of the present invention.

The illustration in FIG. 3 shows one embodiment of the bottom bracket. The bottom bracket comprises two bottom bracket cups 301, a bottom bracket screw cap 302, one or more O-rings 303, a bearing sleeve 304, an uni-directional thrust bearing 305, a crown and bearing assembly 306, one or more bearing sleeve retention screws 307, a bottom bracket housing 310 and one or more bottom bracket cap anti-rotation screws 315.

Figure 4:
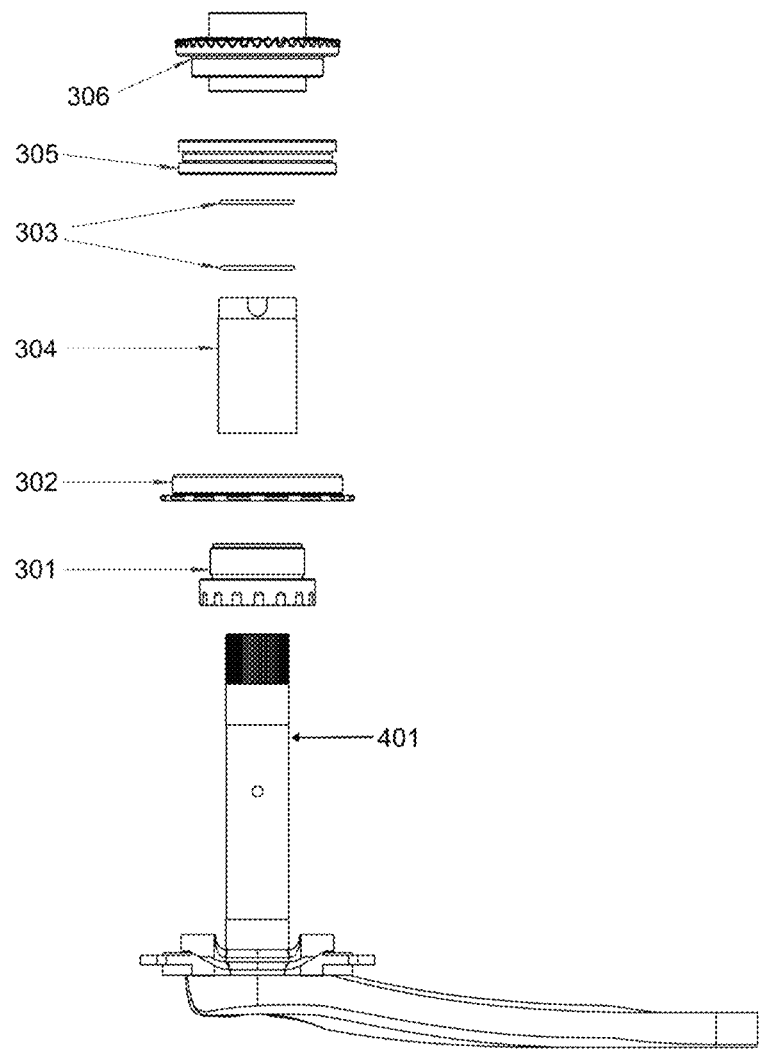
FIG. 4 depicts portions of the bottom bracket components and a drive-side crank spindle.
Figure 5:
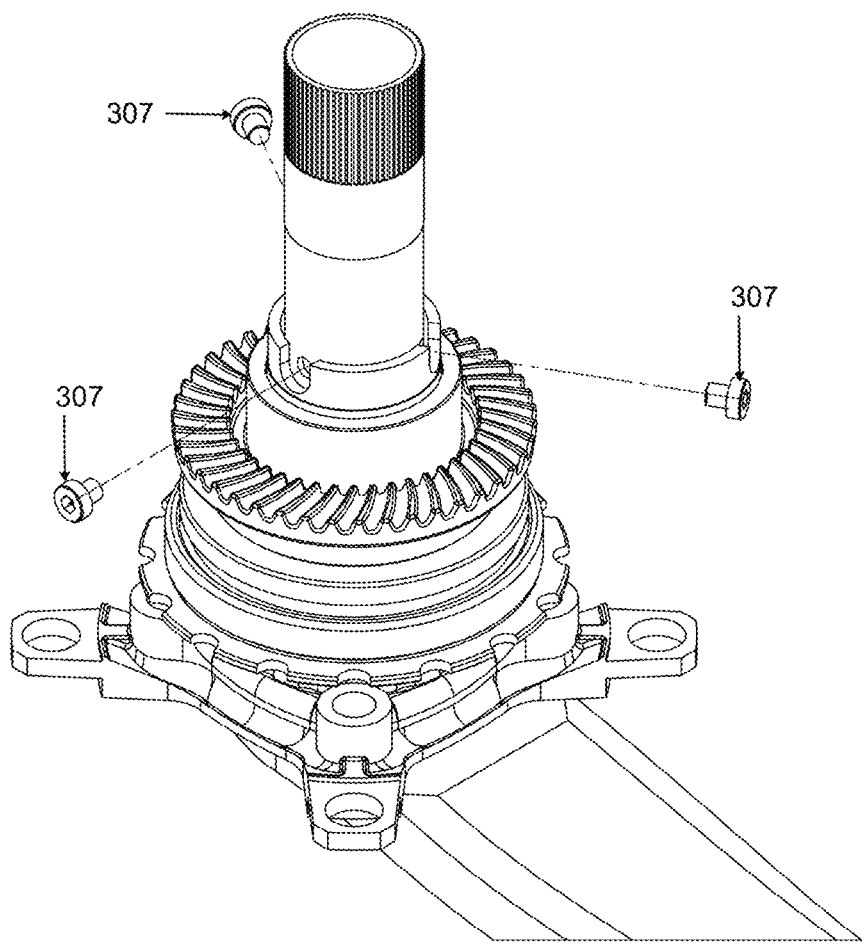
FIG. 5 depicts the portions of the bottom bracket components assembled to the drive-side crank spindle.

Referring to both FIGS. 3-5. During the assembly of the bottom bracket, one of the bottom bracket cups 301 is attached to the bottom bracket screw cap 302 and both are ringed around a drive-side crank spindle 401. The one or more O-rings 303 are inserted into the bearing sleeve 304 and the bearing sleeve 304 is ringed around the drive-side crank spindle and fitted within the bottom bracket screw cap 302. The uni-directional thrust bearing 305 is then sleeved over the bearing sleeve 304 and fitted inside the bottom bracket screw cap 302, followed by the crown and bearing assembly 306 with its crown gear teeth facing away from the drive crank. In other embodiments not shown in the drawings, the crown gear teeth can be facing the drive crank. Finally, the bearing sleeve retention screws 307 are screwed onto the drive-side spindle 401 to retain the bearing sleeve 304 and the other components around the drive-side crank spindle 401. A bottom bracket housing 310 is inserted into the bottom bracket shell from one side, and the drive-side crank spindle 401 with the components are placed inside the bottom bracket housing 310 from the opposite side of the bottom bracket shell. The bottom bracket housing 310 has through-holes on its cylindrical wall that align with the through-holes of the bottom bracket shell.

With the unattached end of the drive-side crank spindle 401 extending out from the bracket housing 310, the other one of the bottom bracket cups 301 can ring around the drive-side crank spindle 401 and attach to the bracket housing 310. In either embodiment of the bicycle frame, the electric motor and gearbox assembly is positioned to have the electric motor-gearbox drive shaft gear pinion aligned and engaged with the crown gear teeth of the crown and bearing assembly 306. The bottom bracket screw cap 302 is secured to the bottom bracket shell by one or more bottom bracket cap anti-rotation screws 315.

Torque from the electric motor-gearbox drive shaft(s) is transferred to the crown and bearing assembly 306 and in turn to the drive-side crank spindle 401. The uni-directional thrust bearing 305 allows the torque to be applied to the spindle only when peddling and the crown and bearing assembly 306 are rotating in the same direction.

Drivetrain

Referring again to FIG. 3. One embodiment of the drivetrain in accordance to the present invention provides an electric motor and an accompanying planetary gearbox coupled to the electric motor. The electric motor and planetary gearbox are encased inside a tube structure, forming an electric motor and planetary gearbox assembly 312. The electric motor and the planetary gearbox are arranged axially inside the tube structure with a drive shaft having a pinion 312a extending from the electric motor and gearbox assembly in the longitudinal direction into the bottom bracket for engaging the crown gear teeth of the crown and bearing assembly 306. In one embodiment, the drive shaft with its pinion 312a and the crown gear teeth of the crown and bearing assembly 306 is a set of spiral bevel gear.

In one embodiment, a tube housing 308 is first inserted into the seat tube or down tube and secured by one or more tube housing screws 309 penetrating through the seat tube or down tube. Then the central bearing insert 311 is inserted into the seat tube or down tube and secured by one or more tube housing screws 309 penetrating through the seat tube or down tube. Finally, the electric motor and gearbox assembly 312 is inserted into the tube housing 308 through the central bearing insert 311 with the extended drive shaft 312a facing outward and is secured by a bearing retention nut 313. The electric motor and gearbox assembly 312 is secured within the tube housing 308. The tube housing 308 has horizontal parallel threads 308a on its external surface to clasp the down tube or seat tube housing screws protruding into the hollow interior space of the down tube or seat tube with the electric motor and gearbox assembly 312 and the tube housing 308 inserted there within. The multiple horizontal parallel threads 308a allow the electric motor and gearbox assembly 312 and the tube housing 308 to be fixed at different positions within the down tube or seat tube.

Electrical wires for power transmission, and optionally control and data wires from the electric motor and gearbox assembly 312 pass through one or more through-holes on the down tube or the seat tube to connect to external battery power supply(ies) and/or other electronic control circuitry(ies).

Figure 6:
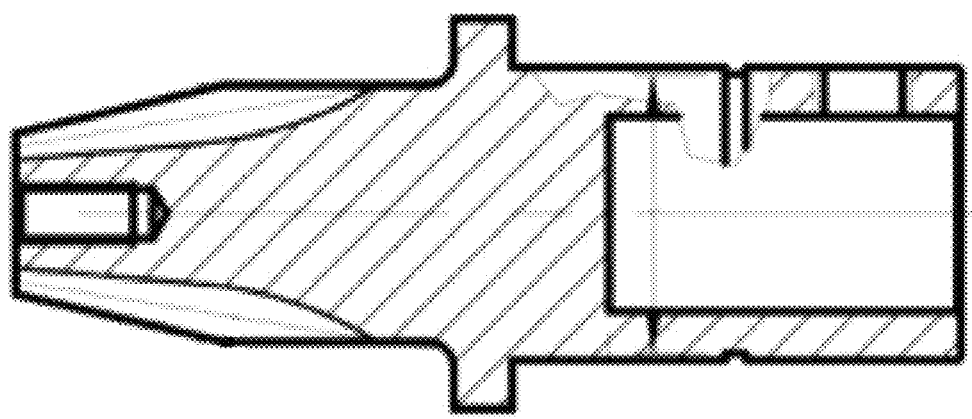
FIG. 6 shows a cross-sectional view of the pinion with fixed drive system that connects the motor to the crown gear of the drivetrain.

FIG. 6 shows the pinion with fixed drive system in accordance to one embodiment of the present invention. The pinion with fixed drive system is connected to a propulsion pinion gearhead through tapered contact fit for concentricity and grub screws to avoid rotation around the motor-gearbox drive shaft. The pinion with fixed drive system and the propulsion pinion gearhead have the same axis. This is ensured by precision tapered press fit around the motor-gearbox drive shaft. The pinion with fixed drive system can be driven in one direction only by limitation of a one-way bearing between the motor and gearbox assembly and the crank. When peddling backward unexpectedly, the pinion with fixed drive system is prevented from any damage to the propulsion pinion gearhead by limitation of the one-way bearing. The one-way bearing also eliminates drag felt by the rider while free-wheeling and places no load on the motor. The frequent interruption during peddling can generate great and abrupt momentum and counter momentum on the components, which may cause damage to the propulsion pinion gearhead. The pinion with fixed drive system and one-way bearing protect the propulsion pinion gearhead from counter momentum and eliminates drag while free-wheeling, therefore not driving the motor and the planetary gearbox in reverse.

Battery Power Supply Assembly

In one embodiment, the battery power supply assembly comprises one or more battery pack(s). Each battery pack 700 comprises a large cylinder 710 and a small cylinder 720 fitted within the large cylinder. The hollow interior space between the interior of the sidewall of the large cylinder and the exterior of the sidewall of the small cylinder is to hold battery cells 730 in a circular arrangement with cathodes/anodes facing up and the opposite electrodes facing down. The battery cells electrodes are connected using a top and a bottom annulus shaped disks 740 with conductive paths and wires. The wires are further extended to the center hollow interior space within the sidewall of the small cylinder, where power control electronics are housed within. Individual battery cell can be removed and replaced easily by lifting the large cylinder.

Figure 7:
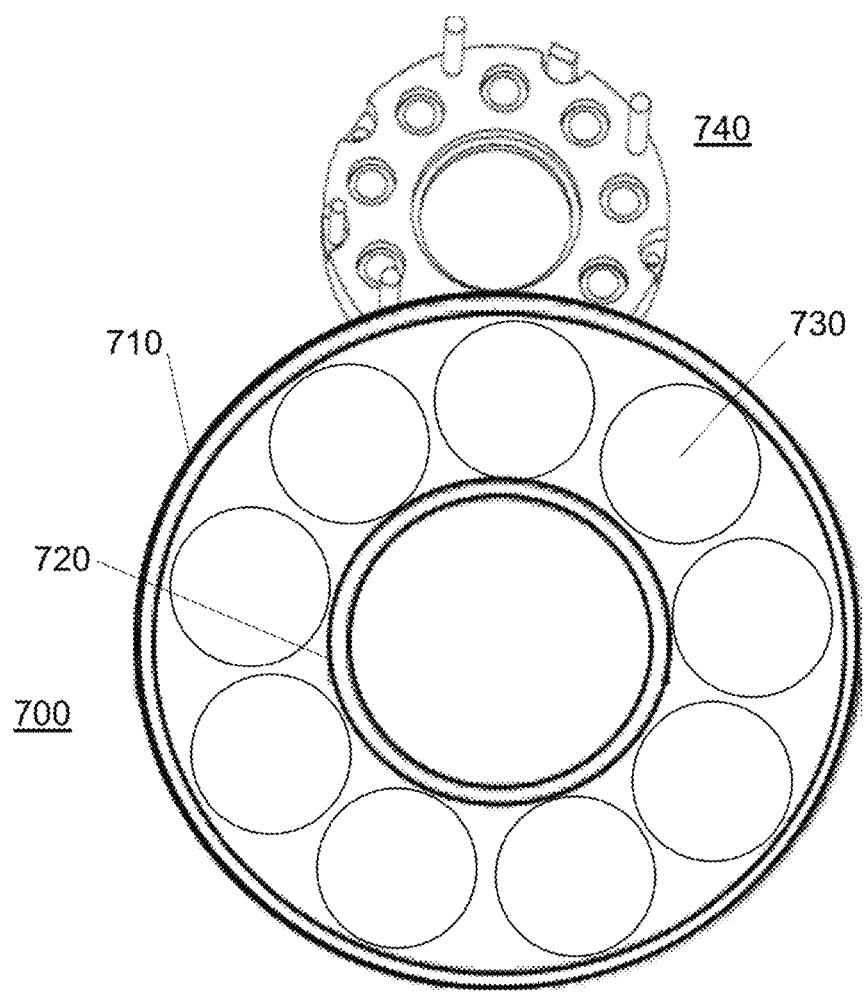
FIG. 7 shows a battery power supply assembly in accordance to one embodiment of the present invention.
Figure 8:
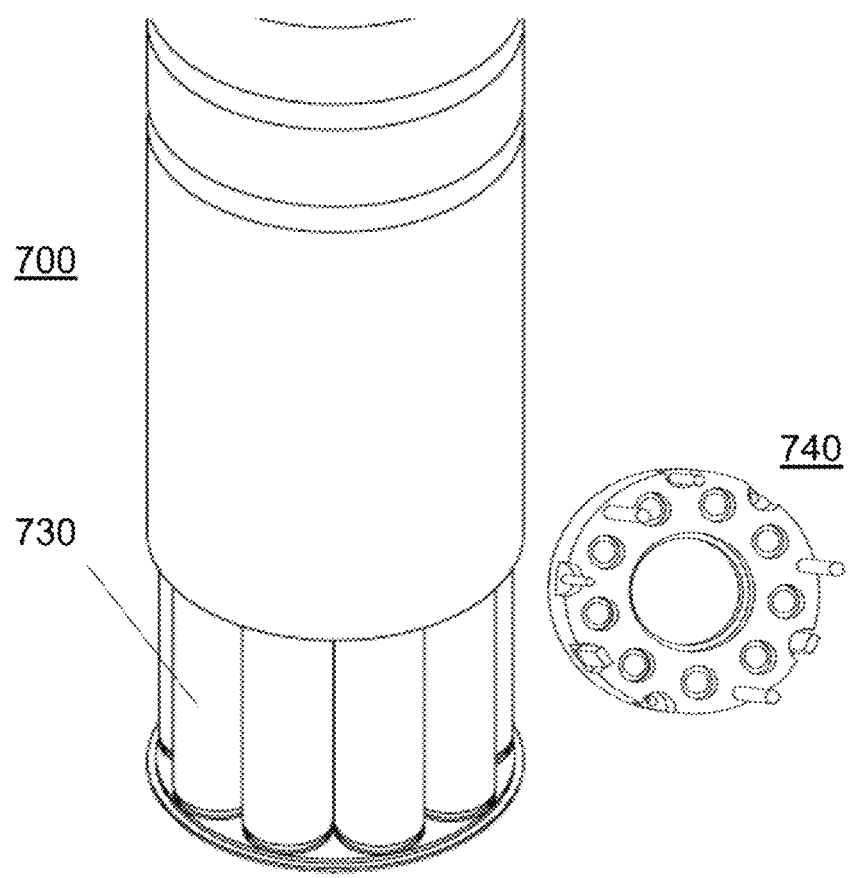
FIG. 8 shows the battery power supply assembly.

FIGS. 7 and 8 show the drawings of the battery power supply assembly in accordance to one embodiment of the present invention. As can be seen in the photographs, battery cells 730 are held within the hollow space between the interior of the sidewall of the large cylinder 710 and the exterior of the sidewall of the small cylinder 720. In accordance to another aspect, circuitries of a battery management system are secured within the center space of the small cylinder.

The whole battery pack battery management system circuitries cylinder arrangement can be further packaged and disguised as a water bottle attached to the seat tube or down tube with wire running from the battery pack, through the seat tube or down tube, to the electric motor encased in the tube structure.

Motor Control

Figure 9:
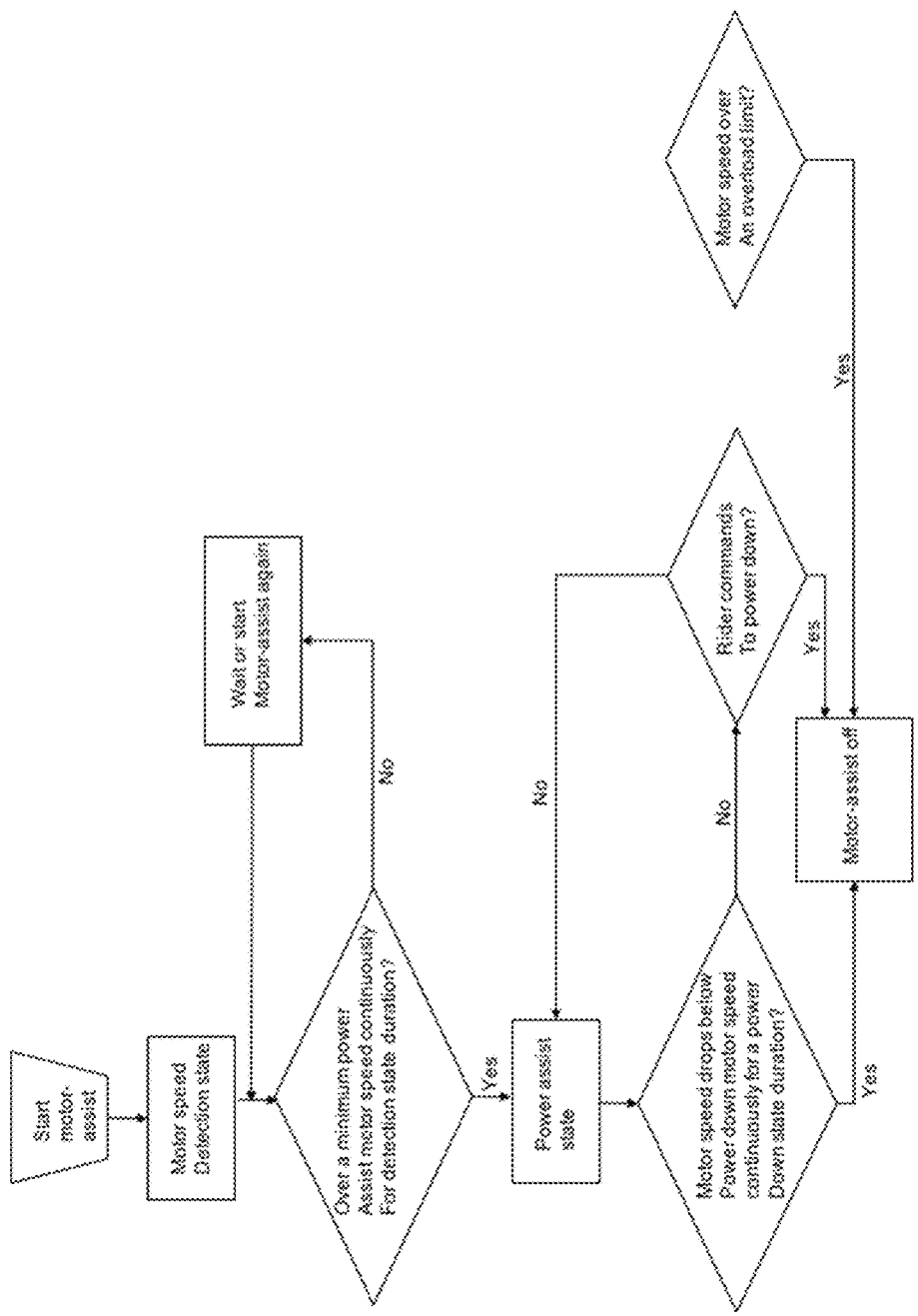
FIG. 9 shows a flowchart diagram of motor control in accordance to one embodiment of the present invention.

Referring to FIG. 9. In one embodiment, a user interface, such as an electro-mechanical actuator is provided such that the rider can control the start and stop of motor-assist (i.e. pressing an 'ON/OFF' button, or selecting among a gear and disengaged or neutral by pressing a 'UP/DOWN' button). The electro-mechanical actuator connects to the motor control circuitry via wire or wireless communication. When the rider commands to start motor-assist via the electro-mechanical actuator, the motor control circuitry caused to preload the motor with reduced torque by causing the motor to draw 500 mA from the battery power supply for the purpose of detecting the motor speed. This duration of 'motor speed detection' state is short, i.e. 10 seconds, and the 'motor speed detection' state is automatically cancelled thereafter until the rider commands to start motor-assist, or automatically repeated after a 'wait' period, i.e. 30 seconds. During the 'motor speed detection' state, if the speed of the motor reaches and maintains a 'minimum power assist' motor speed, i.e. 4000 RPM, or higher, the motor advances to the 'power assist' state. The 'power assist' state has three sub-states: 'gears 1', 'gear 2', and 'gear 3' that can be controlled by commanding via the electro-mechanical actuator (i.e. pressing a 'UP/DOWN' button). The 'power assist' state is permanent until: a) motor speed drops and maintains below a 'power down' speed, i.e. 3000 RPM, for longer than 'power down' state duration, i.e. 0.1 seconds; or b) the rider commands via the electro-mechanical actuator to shut off motor-assist (i.e. selecting 'OFF' mode, or selecting 'DOWN' when in gear 1, or holding the 'DOWN' button for more than i.e. 2 seconds to select disengaged or neutral). There is an independent current (torque) limiter that shuts off motor-assist if motor speed exceeds an overload limit, i.e. 9000 RPM. When motor-assist is shutoff or stopped, no electricity is drawn by the motor. In this embodiment, a motor speed sensor can be built-in to the motor or the motor control circuitry, providing the motor speed measurement data signal to the motor control circuitry.

Figure 10:
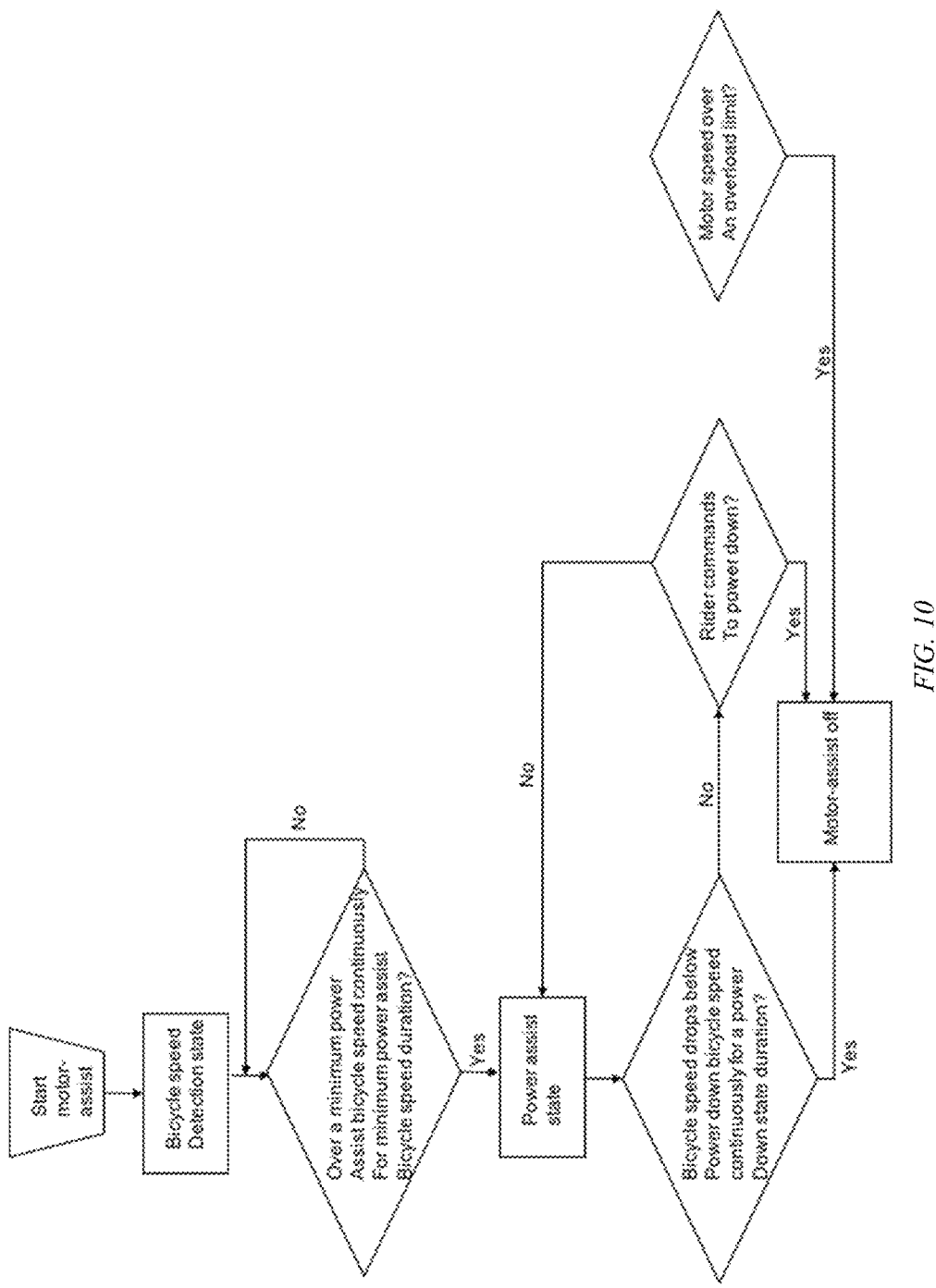
FIG. 10 shows a flowchart diagram of motor control in accordance to another embodiment of the present invention.
Figure 11:
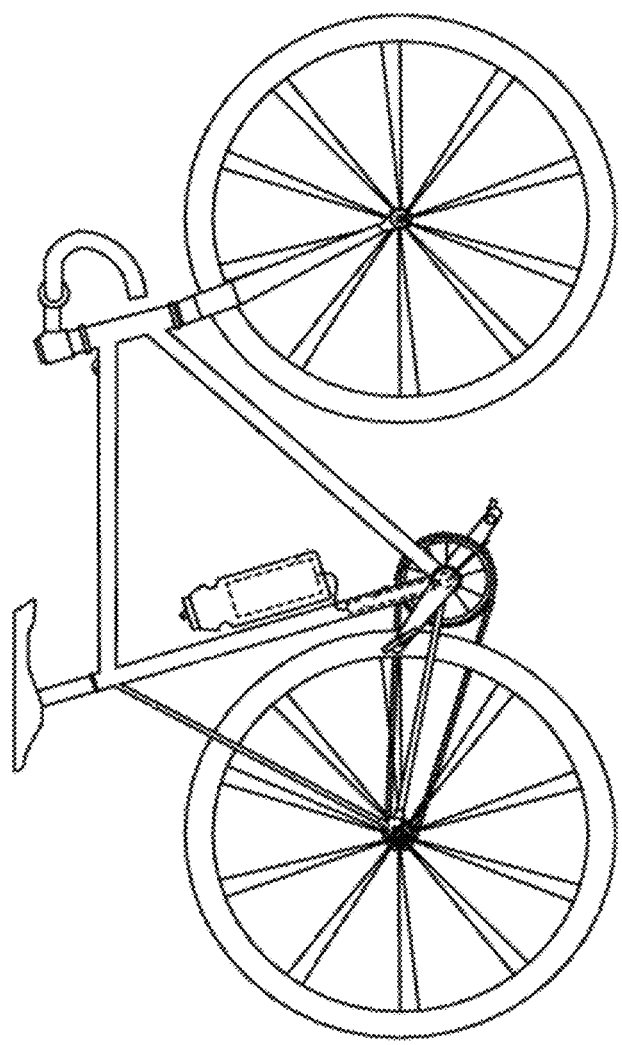
FIG. 11 shows a side view of an electric bicycle incorporating the system of single electric motor in accordance to one embodiment of the present invention.
Figure 12:
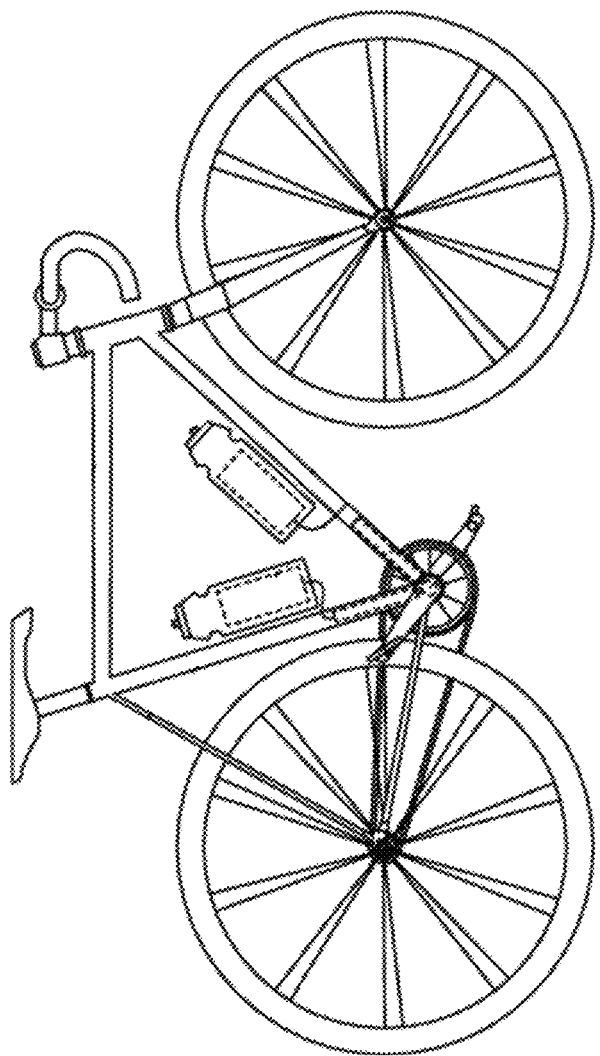
FIG. 12 shows a side view of an electric bicycle incorporating the system of double electric motors in accordance to one embodiment of the present invention.

Referring to FIG. 10. In an alternative embodiment, a user interface, such as an electro-mechanical actuator is provided such that the rider can control the start and stop of motor-assist (i.e. pressing an 'ON/OFF' button or selecting among a gear and disengaged or neutral by pressing a 'UP/DOWN' button). The electro-mechanical actuator connects to the motor control circuitry via wire or wireless communication. In one embodiment, when the rider commands start motor-assist via the electro-mechanical actuator, the motor control circuitry continuously takes the output signal from a bicycle speed sensor for measurement of the actual bicycle speed in a 'bicycle speed detection' state. If the actual bicycle speed is maintained above a 'minimum power assist' speed, i.e. 5 km/h, or higher for continuously for an 'minimum power assist speed' duration, i.e. 10 seconds, the motor control circuitry causes the motor to draw electricity from the battery power supply and enter 'power assist' state. The 'power assist' state has three sub-states: 'gears 1', 'gear 2', and 'gear 3' that can be controlled by commanding via the electro-mechanical actuator (i.e. pressing a 'UP/DOWN' button). The 'power assist' state is permanent until: a) the bicycle speed drops and maintains below a 'power down' speed, i.e. 3 km/h, for longer than 'power down' state duration, i.e. 0.1 seconds; or b) the rider commands via the electro-mechanical actuator to shut off motor-assist (i.e. selecting 'OFF' mode, selecting 'DOWN' when in gear 1, or holding the 'DOWN' button for more than i.e. 2 seconds to select disengaged or neutral). There is an independent current (torque) limiter that shuts off motor-assist if motor speed exceeds an overload limit, i.e. 9000 RPM. When motor-assist is shutoff or stopped, no electricity is drawn by the motor. In this alternative embodiment, the bicycle speed is detected by a speed sensor that can be a separate component FIG. 11 shows a side view of an electric bicycle incorporating the system of single electric motor in accordance to one embodiment of the present invention. FIG. 12 shows a side view of an electric bicycle incorporating the system of double electric motors in accordance to one embodiment of the present invention.

The embodiments disclosed herein may be implemented using general purpose or specialized computing devices, computer processors, or electronic circuitries including but not limited to digital signal processors (DSP), application specific integrated circuits (ASIC), field programmable gate arrays (FPGA), and other programmable logic devices configured or programmed according to the teachings of the present disclosure. Computer instructions or software codes running in the general purpose or specialized computing devices, computer processors, or programmable logic devices can readily be prepared by practitioners skilled in the software or electronic art based on the teachings of the present disclosure.

In some embodiments, the present invention includes computer storage media having computer instructions or software codes stored therein which can be used to program computers or microprocessors to perform any of the processes of the present invention. The storage media can include, but are not limited to, floppy disks, optical discs, Blu-ray Disc, DVD, CD-ROMs, and magneto-optical disks, ROMs, RAMs, flash memory devices, or any type of media or devices suitable for storing instructions, codes, and/or data.

The foregoing description of the present invention has been provided for the purposes of illustration and description. It is not intended to be exhaustive or to limit the invention to the precise forms disclosed. Many modifications and variations will be apparent to the practitioner skilled in the art.

The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

The invention claimed is:

1. A system of battery-powered electric motor propulsion for supplying assistive propelling power to conventional bicycles, comprising:
   a bicycle frame comprising one or more interconnecting frame tubes and a bottom bracket shell;
   a bottom bracket comprising at least a spindle and a crown and bearing assembly ringed around the spindle;
   one or more drivetrains, each comprising a motor connected to a drive shaft having a pinion with a fixed drive system; and
   a drivetrain controller comprising:
      a user interface providing user controls for commanding the start and stop of the motor, and selecting one or more torque levels of the motor; and
      a motor control circuitry connected to the user interface and the motor and configured to execute a motor control sequence comprising:
         an initial motor speed detection state activated by a start command from the user interface during which the motor speed is being detected for an initial motor speed detection state period;
         if the motor speed is higher than a power assist motor speed threshold continuously during the initial motor speed detection state period, then a power assist state is activated during which the motor is turned on fully and output one of the one or more torque levels selected by the user interface;
         a continuous motor speed detection state where the motor speed is being continuously detected, and if the motor speed is detected to be below a power shutdown motor speed threshold continuously for a power shutdown state period, then the motor is turned off, wherein the continuous motor speed detection state is canceled and the motor is turned off if a stop command from the user interface is received;
   wherein at least one of the interconnecting frame tubes connects with the bottom bracket shell;
   wherein the bottom bracket shell has a through-hole at where each of the frame tubes that is connecting with the bottom bracket shell such that interior space of the frame tubes is accessible from within the bottom bracket shell;
   wherein, when assembled, each of the drivetrains is inserted and secured within the interior space of one of the frame tubes that is connecting with the bottom bracket shell;

wherein, when assembled, a bottom bracket housing is housed within the bottom bracket shell; and wherein, when assembled, the drive shaft of each of the drivetrains is extended into the bottom bracket such that the pinion of the drive shaft is aligned and engaged with crown gear teeth of the crown and bearing assembly allowing torque generated from the motor of each of the drivetrains to transfer to the crown and bearing assembly and in turn to the spindle.

2. The system of claim 1, further comprising a battery power supply assembly;

wherein the battery power supply assembly comprises one or more battery packs;

wherein each of the battery packs comprises a large cylinder, a small cylinder fitted within the large cylinder, and a hollow interior space existed between the large cylinder and the small cylinder for holding battery cells in a circular arrangement; and wherein each of the battery packs is packaged as a water bottle, attached to one of the frame tubes, and connected to the drivetrain by a electrical wire running through a though-hole on the frame tube having the drivetrain secured there within.

3. The system of claim 1, wherein the bottom bracket shell is detachable from the interconnecting frame tubes.

4. The system of claim 1, wherein the bottom bracket further comprises an uni-directional thrust bearing that allows the torque received by the crown and bearing assembly to be applied to the spindle only when peddling and the crown and bearing assembly are rotating in same direction.

5. The system of claim 1, wherein the motor control circuitry further configured to turn off the motor if the motor speed is higher than an overload limit.

6. A system of battery-powered electric motor propulsion for supplying assistive propelling power to conventional bicycles, comprising:

a bicycle frame comprising one or more interconnecting frame tubes and a bottom bracket shell;

a bottom bracket comprising at least a spindle and a crown and bearing assembly ringed around the spindle;

one or more drivetrains, each comprising a motor connected to a drive shaft having a pinion with a fixed drive system;

a bicycle speed sensor; and a drivetrain controller comprising:

a user interface providing user controls for commanding the start and stop of the motor, and selecting one or more torque levels of the motor; and a motor control circuitry connected to the user interface and the motor and configured to execute a motor control sequence comprising:

an initial motor speed detection state activated by a start command from the user interface during which the bicycle speed is being detected by the bicycle speed sensor;

if the bicycle speed is higher than a power assist bicycle speed threshold continuously during a minimal power assist bicycle speed period, then a power assist state is activated during which the motor is turned on fully and output one of the one or more torque levels selected by the user interface;

a continuous bicycle speed detection state where the bicycle speed is being continuously detected by the bicycle speed sensor, and if the bicycle speed is detected to be below a power shutdown bicycle speed threshold continuously for a power shutdown state period, then the motor is turned off, wherein the continuous bicycle speed detection state is canceled and the motor is turned off if a stop command from the user interface is received;

wherein at least one of the interconnecting frame tubes connects with the bottom bracket shell;

wherein the bottom bracket shell has a through-hole at where each of the frame tubes that is connecting with the bottom bracket shell such that interior space of the frame tubes is accessible from within the bottom bracket shell;

wherein, when assembled, each of the drivetrains is inserted and secured within the interior space of one of the frame tubes that is connecting with the bottom bracket shell;

wherein, when assembled, a bottom bracket housing is housed within the bottom bracket shell; and wherein, when assembled, the drive shaft of each of the drivetrains is extended into the bottom bracket such that the pinion of the drive shaft is aligned and engaged with crown gear teeth of the crown and bearing assembly allowing torque generated from the motor of each of the drivetrains to transfer to the crown and bearing assembly and in turn to the spindle.

7. The system of claim 6, further comprising a battery power supply assembly;

wherein the battery power supply assembly comprises one or more battery packs;

wherein each of the battery packs comprises a large cylinder, a small cylinder fitted within the large cylinder, and a hollow interior space existed between the large cylinder and the small cylinder for holding battery cells in a circular arrangement; and wherein each of the battery packs is packaged as a water bottle, attached to one of the frame tubes, and connected to the drivetrain by a electrical wire running through a though-hole on the frame tube having the drivetrain secured there within.

8. The system of claim 6, wherein the bottom bracket shell is detachable from the interconnecting frame tubes.

9. The system of claim 6, wherein the bottom bracket further comprises an uni-directional thrust bearing that allows the torque received by the crown and bearing assembly to be applied to the spindle only when peddling and the crown and bearing assembly are rotating in same direction.

10. The system of claim 6, wherein the motor control circuitry further configured to turn off the motor if the motor speed is higher than an overload limit.

* * * * *